United States Patent [19]
Mor et al.

[11] Patent Number: 5,969,026
[45] Date of Patent: Oct. 19, 1999

[54] WETTABLE POLYMER FIBERS

[75] Inventors: Ebrahim Mor, Laguna Niguel, Calif.;
Vasanthakumar Narayanan, Knoxville, Tenn.

[73] Assignee: Techmer PM, Rancho Dominguez, Calif.

[21] Appl. No.: 08/883,092

[22] Filed: Jun. 26, 1997

[51] Int. Cl.$^6$ ..................................................... C08K 5/10
[52] U.S. Cl. ........................................... 524/317; 524/313
[58] Field of Search ..................................... 524/313, 317

[56] References Cited

U.S. PATENT DOCUMENTS

| | | | |
|---|---|---|---|
| 2,462,331 | 2/1949 | Meyers | 260/23 |
| 3,048,263 | 8/1962 | Sacks et al. | 206/45.33 |
| 3,048,266 | 8/1962 | Hackel et al. | 206/45.33 |
| 3,285,855 | 11/1966 | Dexter et al. | 252/57 |
| 3,644,482 | 2/1972 | Dexter et al. | . |
| 3,847,676 | 11/1974 | Palmer et al. | . |
| 3,867,324 | 2/1975 | Clendinning et al. | . |
| 3,973,068 | 8/1976 | Weber | . |
| 4,070,218 | 1/1978 | Weber | . |
| 4,073,852 | 2/1978 | Mesek | . |
| 4,076,698 | 2/1978 | Anderson et al. | . |
| 4,181,762 | 1/1980 | Benedyk | . |
| 4,189,420 | 2/1980 | Sugimoto et al. | . |
| 4,258,097 | 3/1981 | Benedyk | . |
| 4,273,802 | 6/1981 | Kamada et al. | . |
| 4,273,892 | 6/1981 | Rave | . |
| 4,274,971 | 6/1981 | Hartinger et al. | . |
| 4,293,460 | 10/1981 | Marshall et al. | 524/313 |
| 4,307,143 | 12/1981 | Meitner | . |
| 4,356,220 | 10/1982 | Benedyk | . |
| 4,363,891 | 12/1982 | Rosen et al. | 524/317 |
| 4,426,477 | 1/1984 | Yasamatsu et al. | 524/313 |
| 4,540,730 | 9/1985 | Kieser | 524/317 |
| 4,578,414 | 3/1986 | Sawyer et al. | 524/313 |
| 4,581,397 | 4/1986 | Witman | 524/313 |
| 4,734,448 | 3/1988 | Kasahara et al. | 524/317 |
| 4,762,873 | 8/1988 | Miyauchi et al. | 524/317 |
| 4,906,687 | 3/1990 | Modic | . |
| 4,923,914 | 5/1990 | Nohr et al. | . |

FOREIGN PATENT DOCUMENTS

| | | | |
|---|---|---|---|
| 0161757 | 11/1985 | European Pat. Off. | 524/317 |
| 0455370 | 11/1991 | European Pat. Off. | 524/313 |
| 53-61648 | 6/1978 | Japan | 524/317 |
| 57-8236 | 1/1982 | Japan | 524/317 |
| 60-44539 | 3/1985 | Japan | 524/313 |
| 4253752 | 9/1992 | Japan | 524/313 |
| 4-308217 | 10/1992 | Japan | 524/313 |
| 4328138 | 11/1992 | Japan | 524/313 |

OTHER PUBLICATIONS

Escorene® PP 35466, Exxon, Technical Bulletin, Sep. 1996.
Atmer® 645, ICI Specialty Chemicals, Technical Bulletin, Jan. 1990.
Eastman®, 1806, MSDS, Rev. Date–Aug. 27, 1991; Print Date–Apr. 21, 1997.

*Primary Examiner*—Bernard Lipman
*Assistant Examiner*—N. Sarofim
*Attorney, Agent, or Firm*—A. M. (Andy) Arismendi, Jr.

[57] ABSTRACT

Wettable fibers or filaments are prepared from a composition having a polymer which has a wetting agent incorporated therein. The polymer is selected from the group consisting of olefin polymers, polyesters and polyamides. The wetting agent consists essentially of a glyceride selected from the group consisting of a mono-glyceride, a combination of mono-glycerides and a mixed glyceride having a mono glyceride content of at least 85 percent by weight. The fatty ester group or groups in the glyceride each have from about 12 to about 22 carbon atoms. The olefin polymer is preferably polypropylene, LLDPE, LDPE and HDPE, more preferably polypropylene. The polyamide is preferably a nylon 6 and nylon 6,6. The polyester is preferably a polyethylene terephthalate and a polybutylene terephthalate.

27 Claims, 3 Drawing Sheets

WETTABLE POLYMER FIBERS

FIELD OF THE INVENTION

The present invention is directed to wettable fibers and filaments of synthetic polymers.

BACKGROUND

There are many olefin polymers which can be made into fibers and filaments. This includes polyethylene, polypropylene, polybutene, polypentene, and ethylene and propylene copolymerized with other olefinic monomers such as higher olefins and conjugated dienes. Olefin polymers are known for their hydrophobic properties. Therefore, wettability of such polymers, including those in fibrous or filament form, is achieved by means of wetting agents provided in, or on, the polymer fibers or filaments.

Such fibers or filaments are useful in producing battery separators (e.g., U.S. Pat. No. 3,847,676); disposable diapers (e.g. U.S. Pat. No. 4,073,852); wiper materials (e.g., U.S. 4,307,143); papers (e.g. U.S. Pat. No. 4,273,892); and filter aids (e.g., U.S. Pat. No. 4,274,971).

U.S. Pat. No. 4,189,420 discloses, inter alia, certain ethylene polymers blended with a polybutene and a mixed glyceride having at least one acyl group of 2 to 6 carbon atoms and at least one acyl group containing 8 to 22 carbon atoms.

U.S. Pat. No. 3,048,266 discloses, inter alia, a polyolefin film containing an anti-fog agent of polyethylene oxide derivative.

U.S. Pat. No. 3,048,263 discloses, inter alia, a polyolefin film containing an anti-fog agent comprising a monoglyceride of a fatty acid and optionally a diglyceride of a fatty acid. An example of a monoglyceride disclosed therein is glyceryl monostearate.

U.S. Pat. No. 2,462,331 discloses, inter alia, the incorporation into polyethylene of polyhydric alcohol esters of metal salts of either saturated or unsaturated monocarboxylic fatty acids.

U.S. Pat. No. 4,578,414 discloses an olefin polymer, preferably a linear low density polyethylene copolymer (LLDPE), having compounded therewith a wetting agent, which is used in forming wettable fibers and/or filaments. The wetting agent has at least one of the following: (1) an alkoxylated alkyl phenol along with a mixed mono-, di- and/or tri-glyceride, or (2) a polyoxyalkylene fatty acid ester, or (3) a combination of (2) and any part of (1).

Whereas it is known that virtually any thermoplastic polymer can be extruded as a coarse strand or monofilament, many of these, such as polyethylene and some ethylene copolymers, have not generally been found to be suitable for the making of fine denier fibers or multi-filaments. A fine denier fiber or filament refers to an extruded strand of denier less than about 15. It is also recognized that the mechanical and thermal conditions experienced by a bundle of filaments, whether in spinning staple fibers or in multi-filaments yarns, are very different to those in spinning monofilaments. The fact that a given man-made polymer can be extruded as a monofilament, does not necessarily herald its use in fine denier or multi-filament extrudates.

The synthetic fibers are produced as continuous filaments by a process known as melt spinning. The plastic pellets are fed in to a hopper and melted in a single screw extruder. The molten polymer is filtered and then metered before being forced through a spinnerette that contains thousands of small holes. The fibers are then solidified by using air and as the fibers are drawn by the action of rollers by sequentially increasing their speeds. The drawn filaments are then wound onto the spools. The spools are made into bunches called tows and cut into staple fibers according to the manufacturer's requirements.

The fibers are the main constituents of fabrics and nonwovens. Nonwovens are unconventional textile assemblies that are obtained by processes other than weaving or knitting. In recent years, there has been a phenomenal growth in the usage of nonwovens in personal hygiene, diapers, adult incontinence, medical, construction, geotextiles and automotive applications. Nonwovens can be made from both natural and synthetic fibers and a combination of both. Usually, the fibers are obtained or extruded and bonded into thin sheets by heat or mechanical or chemical means. The main types of nonwovens used in the market include the spunbonded and melt blown types. The details of these types of materials and their manufacturer will be explained in the following paragraphs. Very often, more than one type of nonwoven is used to make laminates or composite structures. The nonwovens are sometimes further bonded to provide them with adequate strength for other operations.

In the manufacture of a spunbond nonwoven, polymer chips are typically fed through a hopper and melted in the single screw extruder. Some machines also have side feeder capability to feed additives, such as pigments. The molten polymer is metered and then forced through several thousand spinnerett holes to form fine continuous filaments. The filaments are drawn and entangled through the action of a venturi and deposited on a collection belt. The unbonded, entangled fibers are then passed through two heated calendar rolls for thermal bonding of the fibers to each other at points of contact. The nonwoven fabric is then wound and shipped to converting applications where the fabric is made into final products. Alternatively or in addition, the fibers are also bonded through needle-punching and chemical bonding. The polymers typically used in spunbonding are polyolefins, such as polyethylene and polypropylene, polyamides and polyesters. Polypropylene is most commonly used with a melt flow rate in the range between 30–40. Polypropylene is easy to process and cost-effective when compared to other polymers. The spunbond polypropylene nonwovens are used in baby diapers, napkins, feminine hygiene products, laminates, adult incontinence, medical garments, agricultural covers, etc.

In the manufacture of a melt blown nonwoven, polymer chips are fed through a hopper and melted in the single screw extruder. Some machines have additional side feeding capacity for additives, including pigments or color masterbatches. The molten polymer is forced through very fine die holes that are situated either vertically or horizontally. The fibers are then subjected to the action of very hot air at very high velocities to elongate the fibers resulting in fibers with sub-micron diameters. The fibers are bonded to each other at contact points as they cool down. Usually, there is no separate bonding process. The melt blown products are typically used in filters, wipes, battery separators, and insulators.

Use of Surfactants in Textile Fibers

The use of surfactants in textile fibers is known. For example, the surfactants have been used as spin finish to provide cohesion between synthetic fibers before drawing and texturing. This also reduces the friction between the rollers and fibers preventing abrasion of rollers and breakage of fibers. The surfactants are also added to the finished fiber goods to impart a desired finish, for example, hydrophilic, hydrophobic, or oil repellent. The surfactant could be cationic (quaternary ammonium compound), anionic (phosphates, sulfates) or nonionic (esters, alcohols, ethoxylates, etc.).

However, their use has been mainly through topical treatments such as spraying, coating, padding, etc. A similar approach has been used conventionally in woven or knitted fabrics and nonwovens. Surfactants have also been blended with the plastic at the melt stage at higher concentrations than in the final article. This material was then cooled and sold in the form of pellets known as additive concentrates or masterbatches. The use of a masterbatch in fiber spinning, nonwoven manufacturing and other related processes to modify the surface is dependent on the final application, migration of the material to the surface, polymer and additive characteristics, process environment and cost. The siloxane or fluorine-based surfactants have tailor-made functional groups that could be either hydrophilic or hydrophobic. The siloxane or fluorine materials are shown to be active on the surface. However, these materials are known to be very expensive and highly migratory and therefore can be leached out. The nonwovens industry that supplies the diaper and hygiene markets has always been on the look-out for a cost-effective additive formulation that is durable and with high rewet characteristics.

The surface coating applications have the following disadvantages: 1) throughput is reduced and more floor space is required; 2) when spraying is involved, the over spray and the spills are environmental concerns; 3) the coating is not usually well-bonded to the fiber and may be partially lost during storage or in subsequent operations or use; and 4) there are always some quality control issues regarding the uniformity of the coating.

Recent advances in this area have been to incorporate the additives in the melt state in attempts to form a melt-stable formulation. The melting point or molecular weight of the additive determines its processability during its incorporation into polymers and the processability at the spinning or blowing state. The lower the molecular weight, the lower the viscosity and this governs the amount of liquid additive that can be incorporated. Two things to keep in mind while melt blending and using the melt blended concentrate for final goods manufacturing are incorporation and migration characteristics: 1) incorporation at the melt state depends on the solubility of the additive in the polymer, additive and polymer type, chemistry, polarity, molecular weight, melting point, etc.; and 2) migration of the additives to the surface depends on the diffusion characteristics of the additive in the solid state, molecular weight, structure, purity, etc.

As long as the above mentioned parameters are carefully selected for a particular application, one will be able to achieve the right type of surface modification and additive incorporation. Various types of additives and their mixing with different types of polymers in the melt stage have been provided in the previous arts. The fine point that is missing is the identification of cost-effective formulation of the concentrates or masterbatches and the way to commercially produce them. As mentioned previously, there is a critical limit on the amount of additive that can be incorporated which depends on the type of additive, type of polymer and the type of equipment employed to produce a commercially viable concentrate that can cater to the commodity goods market.

To our knowledge the prior art has used a mixture of mono-, di-, or tri-glyceride that is in the form of liquid that has tendency to "bloom" or migrate to the surface. This results in part or most of the surfactant being transferred to other surfaces in contact with the hydrophilic material. The surfactant may also be lost during storage and has poor temperature stability, U.S. Pat. No. 4,578,414. Therefore, a need exists for wetting agents which resist migration and transference, are easily incorporated and commercially viable.

SUMMARY OF THE INVENTION

Accordingly, there is provided wettable fibers or filaments prepared from a composition comprising a polymer having incorporated therein a wetting agent, wherein said polymer is selected from the group consisting of olefin polymers, polyesters and polyamides and wherein said wetting agent consists essentially of a glyceride selected from the group consisting of a mono-glyceride, a combination of mono-glycerides and a mixed glyceride having a mono glyceride content of at least 85 percent by weight. These limitations provide a glyceride which is solid at room temperature and has a defined melting point, preferably below that of the polymer. In one embodiment, the glyceride is a mono glyceride having the empirical formula

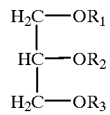

wherein —OR, —OR$_2$, and —OR$_3$ represent, independently, hydroxyl or a fatty acid ester group, but where only one of them is a fatty ester group having from about 12 to about 22 carbon atoms. Preferably, the -OR$_2$ group is a hydroxyl group. More preferably, the monoglyceride is glyceryl monostearate. Combinations of mono-glycerides may also be used.

In another embodiment, the glyceride is a mixed glyceride, wherein the mixed glyceride is a combination of at least one mono-glyceride and at least one other glyceride selected from the group consisting of di-glycerides and tri-glycerides, wherein each glyceride in the combination has the empirical formula

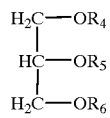

wherein —OR$_4$, —OR$_5$, and —OR$_6$ represent, independently, a hydroxyl group or a fatty acid ester group and a mono-glyceride has only one fatty ester group, a di-glyceride has two fatty ester groups and the tri-glyceride has three fatty ester groups. Each fatty ester group thereof is the same or different and has from about 12 to about 22 carbon atoms. Again, the monoglyceride content in the mixed glyceride is at least 85% by weight.

The olefin polymer is preferably polypropylene, LLDPE, LDPE and HDPE, more preferably polypropylene. The polyamide is preferably a nylon 6 and nylon 6,6. The polyester is preferably a polyethylene terephthalate and polybutylene terephthalate.

The wetting agent is present in an amount of about 0.1 to about 20 percent by weight, preferably about 1 to about 10 percent by weight.

The wettable fibers or filaments of the present invention are useful to form part, or comprise the majority portion, of end products such as diaper innerliners, battery cell separators, filters, paper reinforcing matrix, separation membranes, moisture permeable diaphragms, and construction material reinforcing matrix. The present fibers are also useful as a blend component for other fibers whereby the thermoplastic properties as well as the wettability, softeners and lubricity of the fibers are found to be advantageous. The fibers or filaments can be in the form of a woven fabric, a non-woven fabric or a knitted. The fibers or filaments may also be in the form of a dispersion in an aqueous medium. The fibers or filaments may be made in a fine denier size.

There is also provided a concentrate having a polymer, for example, polypropylene (PP) homopolymer, containing a wetting agent. The concentrate is used in forming hydrophilic, smooth fibers and nonwovens with improved "textile-like" feel and elongation. Preferably, the wetting agent used in the present invention is a solid glyceride mono stearate (GMS) with at least 85% monoglyceride by weight. This material has a defined melting characteristic and is found to be non-transferring to other substrates in contact with the fibers or filaments under storage conditions (40–50° C. and 1 kg pressure) and in other environments. The olefin types used include LDPE, LLDPE, HDPE and PP homopolymers and olefinic copolymers.

DETAILED DESCRIPTION OF THE INVENTION

Figure 1:
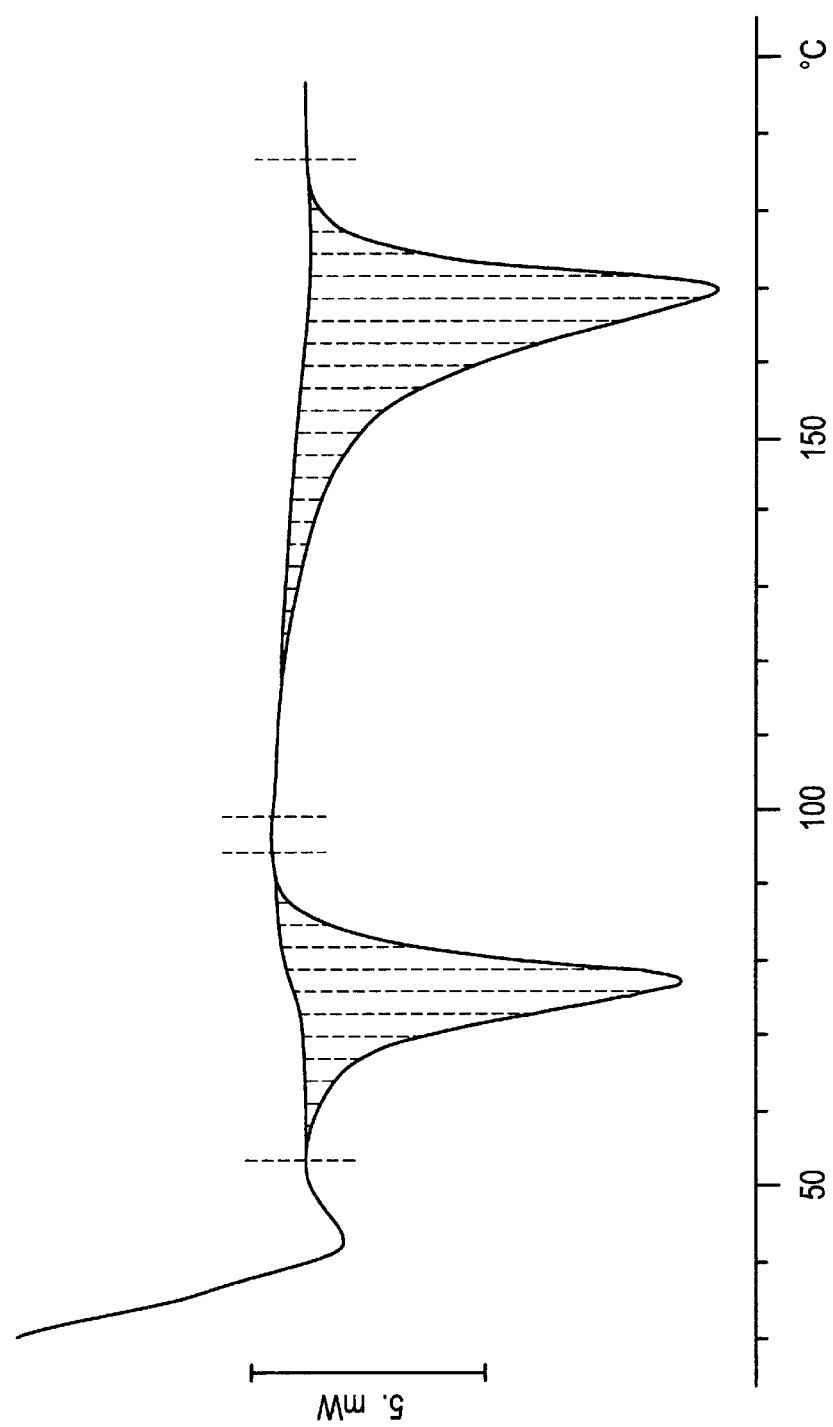
FIG. 1 is a DSC curve of Formulation #1 (heating).

Accordingly, there is provided wettable fibers or filaments prepared from a composition comprising a polymer having incorporated therein a wetting agent, wherein said polymer is selected from the group consisting of olefin polymers, polyesters and polyamides and wherein said wetting agent consists essentially of a glyceride selected from the group consisting of a mono-glyceride, a combination of mono-glycerides and a mixed glyceride having a mono glyceride content of at least 85 percent by weight. These limitations provide a glyceride which is solid at room temperature and has a defined melting point, preferably below that of the polymer. In one embodiment, the glyceride is a mono glyceride having the empirical formula

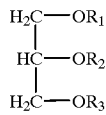

wherein $-OR_1$, $-OR_2$, and $-OR_3$ represent, independently, hydroxyl or a fatty acid ester group, but where only one of them is a fatty ester group having from about 12 to about 22 carbon atoms. Preferably, the $-OR_2$ group is a hydroxyl group. More preferably, the monoglyceride is glyceryl monostearate. Combinations of monoglycerides may also be used.

In another embodiment, the glyceride is a mixed glyceride, wherein the mixed glyceride is a combination of at least one mono-glyceride and at least one other glyceride selected from the group consisting of di-glycerides and tri-glycerides, wherein each glyceride in the combination has the empirical formula

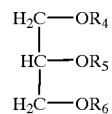

wherein $-OR_4$, $-OR_5$, and $-O_6$ represent, independently, a hydroxyl group or a fatty acid ester group and a monoglyceride has only one fatty ester group, a di-glyceride has two fatty ester groups and the tri-glyceride has three fatty ester groups. Each fatty ester group thereof is the same or different and has from about 12 to about 22 carbon atoms. Again, the monoglyceride content in the mixed glyceride is at least 85% by weight. The at least 85% limitation may be achieved by blending glycerides having different purities relative to a given monoglyceride.

Olefin Polymers

Typical organic polymeric materials contemplated include synthetic organic polymers and copolymers, especially including polyethylene, polypropylene, poly(1-butene), poly(4-methyl-1-pentene), ethylene-propylene copolymers, ethylene-1-butene copolymers, and ethylene-1-hexene copolymers, and homopolymers and copolymers of conjugated dienes monomers, copolymers of two or more conjugated dienes, and copolymers of a conjugated diene and another vinyl monomer, wherein the conjugated dienes are preferably ones containing from 4 to 8 carbon atoms, e.g., butadiene, isoprene and the like.

POLYAMIDES

Polyamides may also be used. The polyamides may be α-polyamides, α,ω-polyamides, and mixtures and/or copolymers of these. An example of an α-polyamide is polycaprolactam (nylon 6), and an example of an α,ω-polyamide is polyhexamethylene adipamide(nylon 6:6). See U.S. Pat. No. 4,906,687, issued to Modic, which is hereby incorporated by reference. Preferred polymers include organic hydrocarbon polymers such a polyethylene, polypropylene, poly(4-methyl-1-pentene), and polystyrene.

POLYESTER

Another useful group of polyesters are those thermoplastic polyesters having a structure formed by polycondensation of a dicarboxylic acid with a glycol. These polyesters may be prepared according to methods well known in the art such as by direct esterification or ester exchange reaction of a dicarboxylic acid or the lower alkyl ester, acid halide, or anhydride derivatives thereof with a glycol.

Among the dicarboxylic acids suitable for preparing polyesters useful in the present invention are those having from 2 to about 25 carbon atoms inclusive, preferably of up to 15 carbon atoms inclusive. The dicarboxylic acids may be aliphatic containing hydrocarbyl groups such as alkylene, alkylidene, cycloalkylene, and cycloalkylidene. The hydrocarbyl groups may contain unsaturation as in carbon-carbon multiple bonds and may be substituted such as an aryaliphatic containing an aryl substituent on an otherwise aliphatic molecule. Examples of suitable aliphatic dicarboxylic acids are oxalic acid, malonic acid, succinic acid, glutaric acid, adipic acid, suberic acid, azelaic acid and sebacic acid. The dicarboxylic acids may also be aromatic having at least one aromatic ring, preferably up to two aromatic rings, and the aromatic rings may contain hydrocarbyl substituents. Where the aromatic dicarboxylic acid contains more than one aromatic ring, the rings can be connected by carbon-carbon bonds, by hydrocarbyl bridging groups such as alkylene or alkylidene groups, or by other bridging groups such as oxo, thio and sulfone. Examples of suitable aromatic dicarboxylic acids are terephthalic acid, isophthalic acid, orthophthalic acid, 1,5-naphthalenic dicarboxylic acid, 2,5-naphthalenic dicarboxylic acid, 2,6-naphthalenic dicarboxylic acid, 2,7-naphthalenic dicarboxylic acid, 4,4'biphenyldicarboxylic acid, 4,4'-dicarboxydiphenylsulfone, 4,4'dicarboxydiphenylmethane, 4,4'-dicarboxydiphenylpropane, and 4,4'-dicarboxydiphenyloctane. Also suitable for use in the invention are dicarboxylic acids having both an aliphatic carboxylic acid moiety and an aromatic carboxylic acid moiety wherein the two acid moieties are connected by carbon-carbon bonds, by hydrocarbyl bridging groups such as alkylene or alkylidene groups, or by other bridging groups such as an oxo group. Examples of such suitable dicarboxylic acids are 4-carboxyphenylacetic acid, 4-carboxyphenoxyacetic acid, 4-carboxyphenoxypropionic acid, 4-carboxyphenoxybutyric acid, 4-carboxyphenoxyvaleric acid, 4-carboxyphenoxyhexoanoic acid and β-(2-alkyl-4-carboxyphenoxy)propionic acids. Mixtures of dicarboxylic acids can also be employed. Terephthalic acid is particularly preferred.

The glycols suitable for preparing the polyesters useful in the present invention include polyhydric alcohols of 2 to about 12 carbon atoms, preferably dihydric alcohols (diols) such as alkylene glycols and aromatic glycols and dihydroxy ethers. Examples of suitable alkylene glycols include ethylene glycol, 1,3-propylene glycol 1,4-butylene glycol, 1,6-hexylene glycol, 2-methyl-1,3-propanediol, 1,10-decamethylene glycol, and 1,12-dodecamethylene glycol. Other suitable alkylene glycols are alicyclic diols such as 1,4-cyclohexane dimethanol. Aromatic glycols can be substituted in whole or in part. Suitable aromatic glycols include aromatic dihydroxy compounds such as p-xylylene glycol, pyrocatechol, resorcinol, hydroquinone, and alkyl-substituted derivatives of these compounds. Suitable dihydroxy ethers include diethylene glycol and triethylene glycol. Preferred glycols are the straight chain alkylene glycols, more preferred are the straight chain alkylene glycols having 2 to 4 carbon atoms.

A preferred group of these polyesters are the poly (alkylene acrylates), in particular the poly(alkylene terephthalates) such as the crystalline copolymers poly (ethylene terephthalate), poly(propylene terephthalate) and poly(butylene terephthalate).

Poly(alkylene terephthaltes), an alkylene glycol, may be formed by the polycondensation of an alkylene glycol and dimethylterephthalate or terephthalic acid. When straight-chained alkylene glycols are utilized, the poly(alkylene terephthalates) have the generalized formula:

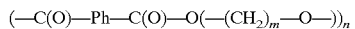

where Ph is a p-phenylene group (—C$_6$H$_4$—), m is the number of carbon atoms in the straight-chained allylene glycol utilized and n varies from 70 to 280. For example, ethylene glycol (m=2) is utilized in forming poly(ethylene terephthalate); 1,3-propylene glycol (m=3) is utilized in forming poly(propylene terephthalate); and 1,4-butylene glycol (m=4) is utilized in forming poly(butylene terephthalate). The molecular weight of these poly(alkylene terephthalates) typically varies from about 20,000 to about 50,000. A suitable process for manufacturing these polymers is disclosed in U.S. Pat. No. 2,465,319 and in British Pat. No. 1,305,130, which are incorporated herein by reference.

Commercially available poly(ethylene terephthalate) and poly(butylene terephthalate) are available from General Electric (GE) under the trade name VALOX® thermoplastic polyester. Other commercial polymers include CELANEX® from Celanese, TENITE® from Eastman Kodak, and VITUF® (PBT) and CLEARTUF® (PET) from Goodyear Chemical. Another commercially available and suitable polyester is ARDEL® polyacrylate available from Amoco. See U.S. Pat. No. 4,906,687 for formulae thereof.

Linear and branched polyesters and copolyesters of glycols and terephthalic or isophthalic acid have been commercially available for a number of years and have been described in U.S. Pat. Nos. 2,465,319 and 3,047,539.

The present invention comprises the use of a composition of a polymer, for example, an polyolefin resin, and additives to form wettable fibers and filaments, especially those of fine denier, with high permanence of wettability. The neat polyolefins are hydrophobic materials and fibrous structures formed from neat polyolefin resins are not readily wet by water. In certain applications, such as those involving the dispersion of fibers in an aqueous medium and transport in or of an aqueous medium through an assembly of fibrous structures, this hydrophobic nature reduces the performance of polyolefin fibers. Imparting a lasting or use-variable surface wettability to polyolefin fibrous structures will improve and expand their use as filtration structures, transport membranes and reinforcing matrices.

The polymer formulations of the present invention preferably contain an amount of the surface active (wetting) agent in the range of about 0.1 to about 20 percent by weight, whether it is only one of the agents, or a combination of such agents; most preferably an amount in the range of about 1 to about 10 percent by weight is used.

The mixing of the surface active agents into the polymer is done by mixing it into molten polymer by commonly used techniques such as roll-milling, mixing in a Banbury type mixer, or mixing in an extruder barrel and the like. The heat history (time at which held at elevated temperature) can be shortened by mixing the surface active agent with unheated polymer particles so as to achieve substantially even distribution of the agent in the mass of polymer, thereby reducing the amount of time needed for intensive mixing at molten temperatures.

Conveniently, the surface active agent can also be added substantially simultaneously or sequentially with any other additives (colorants, dyes, and the like) which may be desired in certain instances. The surface active agents may also be preblended with other additives and the blend then added to the polymer. It is contemplated that in some instances these surface active agents should have the additional benefit of aiding the other additives to become more easily or evenly dispersed or dissolved in the polymer. For easier batch-to-batch control of quality, it may be preferred to employ concentrated masterbatches of polymer/agent blends which are subsequently blended, as portions, to additional quantities of polymer to achieve the final desired formulation. The masterbatch, or the neat additives, may be injected into freshly prepared polymer while the polymer is still molten and after it leaves the polymerization vessel or train, and blended therewith before the molten polymer is chilled to a solid or taken to further processing. It is within the purview of the present invention to employ blends or alloys of olefin polymers, whether they be of the above described polypropylene, LDPE, LLDPE, HDPE or other olefin polymers or copolymers made using a free-radical initiator or a coordination catalyst. Polypropylene is an example of an olefin polymer made using a coordination catalyst (e.g. the well-known Ziegler or Natta catalysts or variations thereof) yet which inherently exhibits a low density compared to polyethylene.

The use of polyolefin fibers is a growth area in the textile and related industries. Material advantages are being recognized as economic considerations drive the replacement of more expensive synthetic and natural fibers. An area where polyolefin fibers are making inroads is the disposable diaper market. Disposable diapers currently use a nonwoven, fibrous web as the skin contact innerliner. This innerliner should join the backing to hold the diaper together, transport fluid away from the skin via a wicking mechanism and provide a comfortable skin contact surface. The materials of choice for innerliners are presently polyester and cellulose with polypropylene gaining an increasing market share. The innerliners are composed of very fine, interconnected fibers of variable lengths. Polyester innerliners wet fairly readily and wick effectively but polyester webs have a coarse feel. Polyester treated with the wetting agent in accordance with the present invention provides a softer feel. Cellulose wets but also absorbs and retains water. Polypropylene provides a much softer web than polyester but it wets poorly, thus requires an added surface active agent. This limits the rate and efficiency of fluid transport due to the difficulty of forcing the fluid into the capillary matrix of the innerliners.

Linear low density polyethylene (LLDPE) fibers exhibit enhanced tactile properties such as softness compared to polypropylene and high density polyethylene. Melt blending linear low resins with a combination of surface active agents and melt spinning the blend produces wettable fibers with tactile properties superior to fibers of barefoot (neat) linear low density polyethylene resins. Webs of the wettable linear low density polyethylene fibers exhibit rapid wetting and transport of aqueous media through the fiber matrix. These fibrous structures demonstrate good performance potential and offer a means for opening new markets of olefin polymers. Wettability is a surface phenomena involving minimization of the interfacial surface energies between adjacent solid and liquid phases. In the case of water and polyolefins, wettability generally requires altering the polymer surface. This may be accomplished via a copolymer composition or by the action of auxiliary surfactants. Copolymers often detract from polyolefin material properties, add expense and make processing more difficult. Surface active agents are generally mobile species which aggregate as an interfacial compatibilizing layer on the polymer surface. The mobility of the surface layer makes it susceptible to solvation and mechanical dispersion. In other cases, where the surface active agents possess a strong affinity for the polyolefin substrate, fiber properties may deteriorate due to plasticization and/or detrimental structural rearrangements. Surfactants generally require an additional process step for application or activation and, in prior art, are often added after forming the fibrous or fabric product.

The present invention includes embodiments of a surface active species, compounded directly with the resin, in contradistinction to post-added agents. The compounded resin is fabricated by conventional processes and the wetting property is present in the product as fabricated. The resin in the present invention is easily processed and shows no detrimental change in properties. A broad range of wetting characteristics such as degree of wetting and permanence may be obtained by varying concentrations and composition of the additive. Resistance to solvation and mechanical dispersion is controlled by providing at least one surface active species that remains partially embedded in the substrate matrix while simultaneously participating in the interfacial zone.

This invention differs from the prior art by incorporating surface active agents directly into the bulk polymer resin rather than introducing a copolymer or applying a surface treatment to fabricated fibrous structures. The surface active agents are entangled with the polymer with the hydrophilic portion being exposed at the fabricated fiber surfaces and the hydrophobic portion of the surface active agents remaining partially embedded in the polymer matrix. The permanence of wettability can be controlled through composition and concentration of the additive.

The preferred blends of the present invention comprise about 80% to about 99.9% of the olefin polymer, the remainder being the wetting agent (or mixture of wetting agents as described in this disclosure), excluding any consideration of the weight of other additives (e.g. pigments, colorants, fillers, etc.) that may comprise a portion of the total final blend. The following examples illustrate particular embodiments of the present invention, but the invention is not limited to the particular embodiments shown.

The novel plastic compositions embodying the present invention are prepared by a number of methods. The novel plastic compositions can be compounded according to any one of several known techniques such as direct addition of all the components, master batching wherein any single master batch contains the wetting agent in a larger proportion relative to the final composition, or any other compounding procedure.

The master batching involves preparation of one or more "packages" or compositions which are subsequently combined into a single homogeneous mixture with the organic polymer material. In the master batching procedure, the wetting agent is initially present at a greater concentration than in the final composition. The separate master batch composition is then combined or blended in proper proportions to produce a polymeric composition embodying the present invention. This master batching technique is a preferred method in that it should improve the dispersibility of the wetting agent throughout the final polymeric composition and ultimate fibers and filaments.

Another preferred method consists essentially of heating the polymer at a temperature below its decomposition temperature, incorporating the initial ingredients of the wetting agents, and mixing so as to obtain a substantially uniform plastic composition. The composition can then be processed to form the fibers and filaments. In the alternative, the plastic composition can be extruded and cooled to form a solid extrudate. Conventional plastic processing equipment can be used for melting the polymer, mixing the polymer with the wetting agent and extruding the resulting plastic composition. Processing conditions, such as temperature, time, and pressure, will be obvious to those skilled in the art.

The novel polymeric compositions of the present invention can also contain non-reactive additives. By the term "non-reactive additives," it is meant a modifying additive, filler or reinforcement commonly used in the formulation of polymeric compositions which does not materially interfere with the properties of the wetting agent in the composition. For example, the compositions of the invention may contain, in addition to the wetting agent and the polymer, such additives as dyes, pigments, and particulate fillers. In particular, the use of such particulate fillers as titanium dioxide, calcium carbonate, talc, clays, glass, and mica is contemplated.

Antioxidants and stabilizers may also be utilized in the polymeric compositions embodying the present invention. In some cases, it may be necessary to add an antioxidant or stabilizer to permit high temperature processing, even though such additive may have some adverse effects on the wettability of polymeric composition.

The preferred antioxidant for this purpose is tetrakis [methylene(3,5-di-tert-butyl-4-hydroxy-hydrocinnamate)] methane. This composition is sold as IRGANOX 1010 by Ciba-Geigy and disclosed by U.S. Pat. Nos. 3,285,855 and 3,644,482, which are hereby incorporated by reference. Other suitable antioxidants are disclosed in U.S. Pat. No. 3,867,324, which is hereby incorporated by reference. The antioxidant(s) is used in a total amount of about 0.001 to about 0.05 percent by weight of the plastic composition.

This invention is the result of carefully applying our knowledge in the area of surfactant chemistry and applications engineering. The prior art includes the use of the melt blendable surfactants in forming hydrophilic nonwovens or fibers. However, the efficacy of these surfactants is severely limited due to poor processability, wettability problems, migration, toxicity, skin-irritability, handling problems, etc. The glyceride with higher content of monoglyceride is the most efficient in terms of wettability because of the higher number of hydroxyl groups when compared to similar products with lower monoglyceride content. This fine point is missing in the previous art that leads to inventors looking at much delayed wetting properties. The hydroxyl groups are much better electron withdrawing than the ester groups.

The glyceride monostearate (GMS) used in the present invention is in a solid form with a melting point between 65–75° C. This very much helps during processing especially in masterbatch preparations and fiber spinning or nonwoven manufacturing. The liquid additives are difficult to process because they drastically change the viscosity of the polymer and they reduce the temperature of the polymer on injecting during processing. This leads to "cold spots" unless the liquid is heated which leads to decomposition of the additives and wasted thermal energy. The incorporation of solid additive in the invention, glyceryl monostearate (GMS) is easier and produces more uniform blend than liquid.

In the prior art on fibers, the mixture of glycerides has been used only in conjunction with other additives to improve the wetting property. However, in the present invention the additive has been used by itself and a controlled migration and desired wetting property is achieved within 72 hours and this depends on the amount of additive, orientation and crystallization of the fibers.

Figure 3:
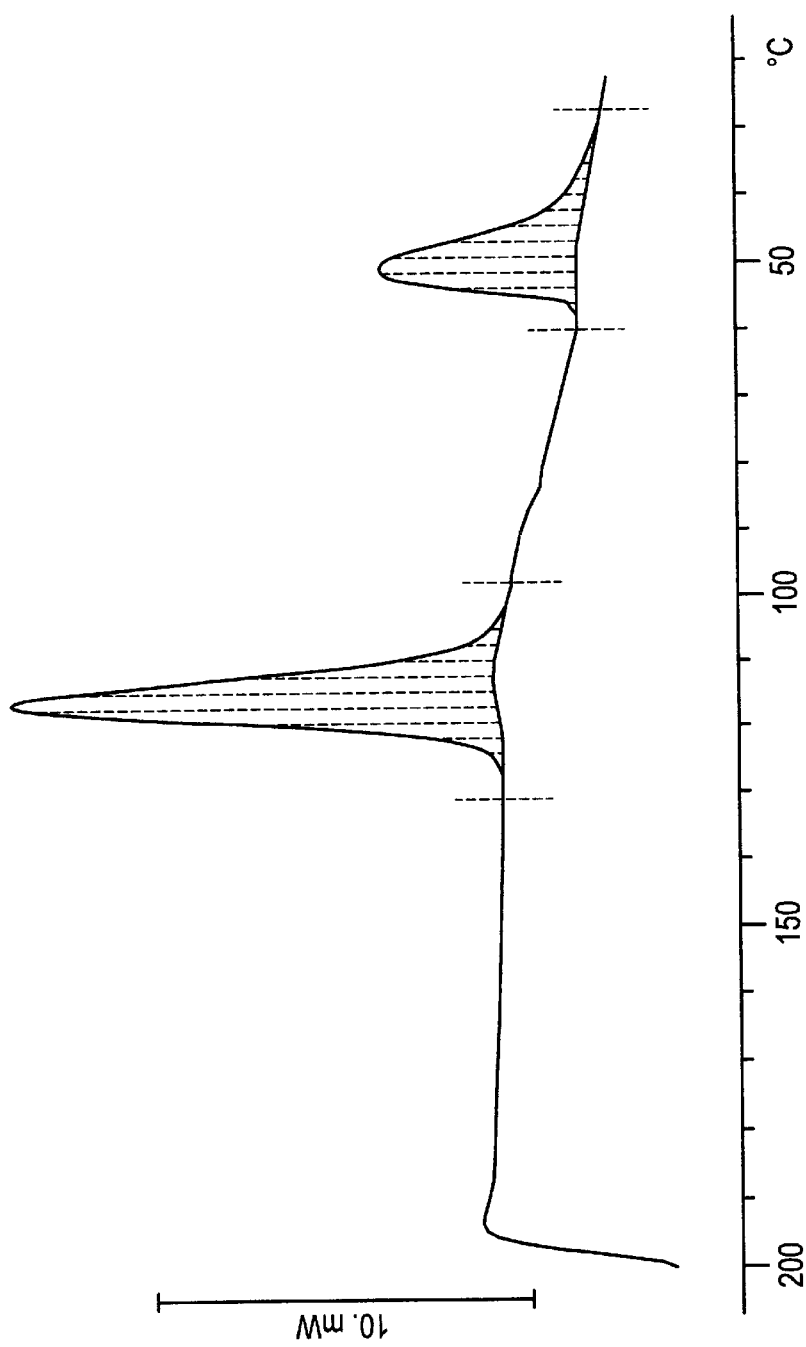
FIG. 3 is a DSC curve of Formulation #1 (cooling).

The liquid additives do not show any phase transition and thus remain in the same state during feeding, extrusion and cooling. The additives will phase separate during cooling and migrate to the surface of the finished products. The migration is dependent on the diffusivity of the additives which in turn depends on the chemical structure, molecular weight of the additives, etc. The additive surfactants contain two parts: the alkyl chain hydrophobic part that is miscible with the polyolefins and the polar hydrophilic group that is completely immiscible with the polymer. Again, the wettability is determined by the presence of the number of hydroxyl and carbonyl groups present on the surface of the polymer. The additive in the present invention is solid and has well-defined melting and crystallization characteristics. This means that on cooling the additive will recrystallize and form a solid that could be an independent crystallite or it could co-crystallize with polypropylene. This becomes interesting in that both the bulk and surface may be modified depending on the mechanism. Part of the reason why we see an improvement in the non-transferability to other contacting surfaces is believed to be due to a thin layer of solid GMS depositing on the polymer surface. The GMS appears to be forming its own crystalline structure and non co-crystallizing with polypropylene and this effect is shown in FIG. 3. Generally speaking, the additives that are not part of the polymer reside in the disordered amorphous regions of the polymer. During crystallization and even well after the fibers are made in the case of polypropylene (PP), the solid GMS is excluded from PP crystalline region generally the central core of the fiber. Accordingly, it is believed that hydrophobic portion of the glyceride is entangled with the PP in the amorphous region of the fiber with the hydrophilic portion of the glyceride exposed at the surface of the fiber. At this point it makes a lot of difference in whether we have predominantly hydroxyl groups or carbonyl groups on the surface. A glyceride with high monoester content will perform much better than the one with lower monoester content since the hydroxyl content is higher. The liquid surfactants usually get wiped or washed away and it really does not matter whether the surfactant is coated onto the surface or melt blended. The incorporation of a solidified surfactant in the plastic according to the present invention provides two homogeneous phases in a stable configuration.

EXAMPLES

Formulations

Formulation #1

The solid wetting agent (trade name Eastman 18-06K distilled monoglyceride which is at least 90% by weight glyceride monostearate (GMS) from Eastman Chemical Company) can be used at a concentration level from 1 to 60 weight percent in polyolefins. The ideal concentrate or masterbatch is the one containing the maximum loading of the wetting agent. In this formulation, a wetting agent concentration in polypropylene (Melt Flow Rate—12; Montel 6301 available from Montel U.S.A.) at 30 weight percent was used. Consequently, any other additive or pigment or filler can be used in the formulation. This concentrate was let down in polypropylene fibers to provide a final level of 1.0%, 3% and 5% of wetting agent by weight. Higher concentrations are uneconomical and may also pose processing problems such as screw slippage during spinning.

Formulation #2

A liquid wetting agent (trade name ATMER 685 from ICI surfactants; a mixed glyceride with $C_{12}$–$C_{16}$ fatty acid adduct—see U.S. Pat. No. 4,578,414) was used at 30 weight percent in polypropylene (Melt Flow Rate—12; Montel 6301). The concentrate was used to make fibers containing 5% by weight final level of wetting agent.

Formulation #3

A combination of liquid surfactants (nonyl phenol ethoxylate with 30 moles of ethoxylation at a 20% by weight and ATMER 685 at 10% by weight) was used at 30 weight percent in polypropylene (MFR-12; Montel 6301; MFR stands for Melt Flow Rate). The concentrate was used to make 5% final levels of additive in fibers.

The Formulations #4 and #5 used in melt spinning trials were slightly altered in regards to the polypropylene(s) used to accommodate high melt flow resins. Two different formulations were prepared for the melt blowing trials.

Formulation #4

This formulation contains Myverol GMS solid additive at 10% by weight, a polypropylene homopolymer of 35 MFR (Amoco Polypropylene Homopolymer Resin Grade 7956) at 20% and a 1000 MFR (Escorene® PP3456 G) polypropylene at 70%. This concentrate was let-down at 20% by weight to obtain a final level of 2% GMS in the melt blown polypropylene nonwovens.

Formulation #5

This contains a liquid additive (trade name ATMER 688 available from ICI America, Inc.) at 20% by weight, a polypropylene homopolymer of 35 MFR (Amoco Polypropylene Homopolymer Resin Grade 7956 available from Amoco Chemical Company) at 20% by weight and a 1000 MFR polypropylene (Escorene® PP3456 G polypropylene available from Exxon ) at 60% by weight. This concentrate was let-down at 15% by weight to obtain a final level of 3% by weight in the melt blown nonwovens.

Formulation #6

Formulation #6 was the same as Formulation #1 except for the amount of wetting agent, Eastman 18-06K available from Eastman Chemical Company; a distilled monoglyceride which has at least 90% by weight monoglyceride, specifically glyceryl monostearate. This formulation contained 25% by weight of the wetting agent.

Processes

A lab scale co-rotating twin screw extruder, made by Leistriz Corporation, Nurnberg, Germany (34 mm diameter screws, having an L/D of 32:1 and eight zones) was used to prepare formulations #1 through #6. The die temperature was kept at 175° C. and the heating elements for the first two zones of the extruder were turned off to prevent build-up of the low melting wetting additive at the feed throat of the extruder. The remaining six (6) zones were maintained at 165° C. (Zone 3) 165° C. (Zone 4), 170° C. (Zone 4), 160° C. (Zone 6). The screw speed was set between 150–200 rpm. The solid wetting agent was pre-mixed with polypropylene and mechanically agitated to provide a uniform mixture. This mixture was then fed into the hopper directly thus avoiding liquid injection in the present invention. The temperature was chosen in a manner not to degrade either the wetting agent or the polymer. By using a solid surfactant, processing was easier and throughput rates were higher in comparison with the liquid surfactants. This is because of the fact that the more time is available within the barrel of the extruder for wetting agent incorporation into the polymer. Thus formulations #1 and #4 were made by first dry blending of the wetting agent with polypropylene prior to being fed to the extruder.

However, the preparation of formulations #2, #3 and #5 involved injection of the liquid wetting agent and liquid wetting agent blends into the extruder at points when the polymer was molten. There are four ports for entry of the liquid additive into the extruder. The first entry port at Zone 3 was used to allow more time for incorporation of the wetting agent which was required for the preparation of formulations #2, #3 and #5. The liquid injection pump was equipped with a positive displacement device also known as a gear pump, a control for regulating the speed of the gears and therefore the amount of liquid per unit time, a temperature monitor and regulator of the liquid and an insulated hose that connects the reservoir containing the liquid additive (i.e., liquid wetting agent) to the extruder port. Depending on the temperature stability and viscosity of the liquid additive, the final throughput rate was chosen to obtain an optimum blend of the liquid additive and the polymer.

Figure 2:
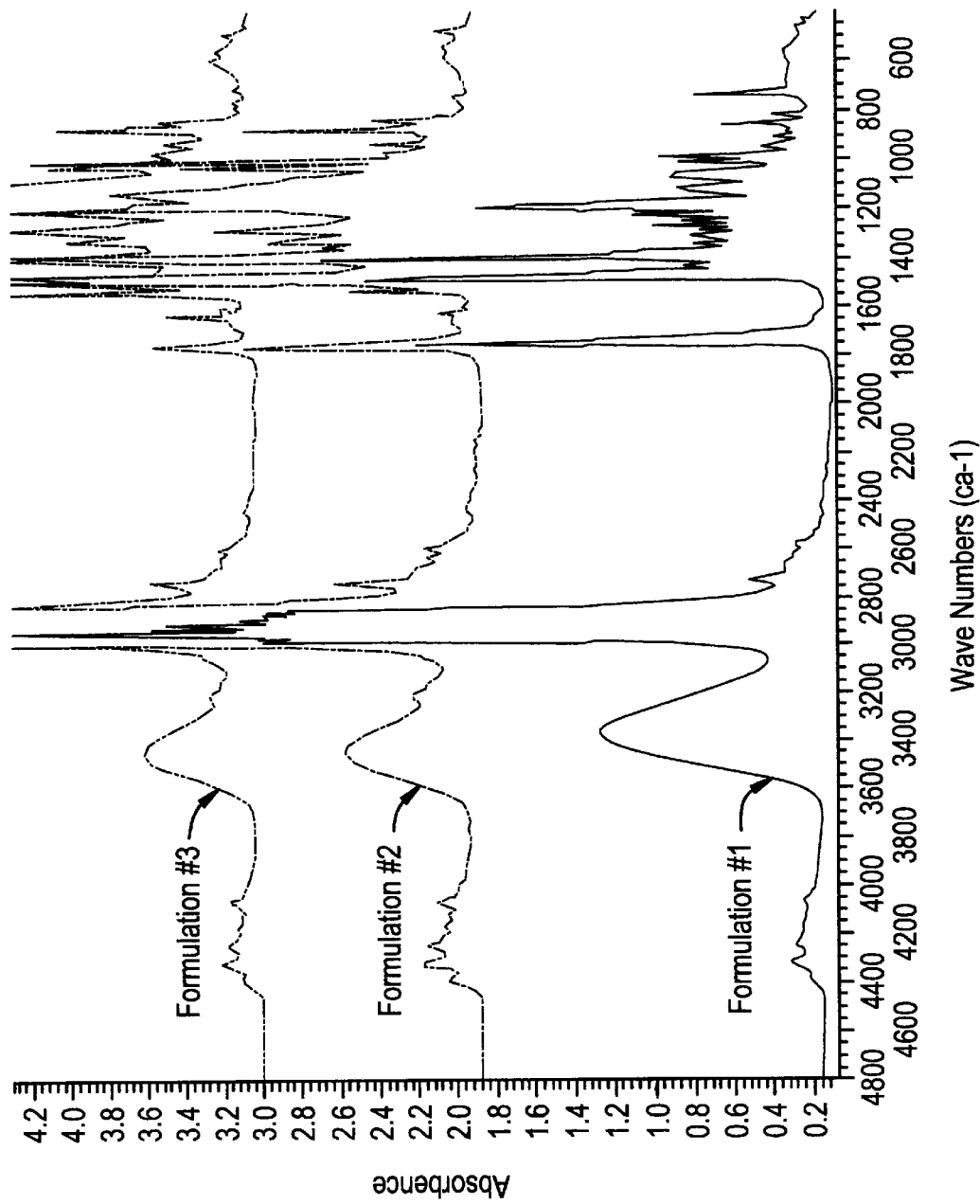
FIG. 2 depicts FTIR curves for Formulations #1, #2 and #3.

The concentrates made in this manner were tested for the additive content using Differential Scanning Calorimetry (DSC) and FTIR to determine the additive level in the concentrates. A Mettler DSC 25 along with a temperature controller TA 4000 was used for the analysis. The heating studies were performed by programming the DSC to heat from 30° C. to 200° C. at a rate of 10° C./min. The cooling studies were performed by quenching the samples from 200° C. to 30° C. at a rate of 10° C./min. The DSC heating curve for formulation #1 is shown in FIG. 1, which shows that the wetting agent melts before the polymer. A quantitative determination was performed by dividing the energy required to melt the wetting agent in joules per gram by the total energy required to melt the concentrate (in joules per gram of polypropylene +the additive). For formulation #1, this was found to be approximately 40% indicating that there was very minimal or no loss of the Wetting agent during the extrusion compounding. However, the quantitative determination of the liquid additives cannot be performed by DSC and thus required the use of other techniques such as FTIR or density measurement. The quantitative determination of the wetting agent using FTIR is shown in FIG. 2. A Nicolet FTIR model 5DXC was used for the study. The absorbance mode was used for the quantitative determination of the additives. The presence of -OH groups can be seen at around 3400 cm−1 wavelength and the —C=O groups at 1740 cm−1. When normalized with the polypropylene peak that is not significantly altered by processing (at around 2700 cm−1), it was found that the Wetting agent in formulation #1 had almost 4 times more —OH groups when compared to the additives in formulations #2 and #3. In some situations, both the DSC and FTIR can be used in tandem to determine the level of the additive in a formulation. The complete absence of the di- and tri-glycerides in formulation #1 is very noticeable from the FTIR curves (around 1600 and 1500 cm−1 in formulations #2 and #3). The results of the quantitative determination of additives are shown in Table 1.

Migration and Transferability

The concentrates were pressed into thin films (about 3 mils thick) using a Carver press and scanned using FTIR to quantify the presence of —OH groups. The temperature of the press was maintained at 200° C. and a constant pressure of 4,000 psi was applied for 1 minute. The press-out was then cooled under same pressure for about the same time. The peak area of —OH groups was divided by the peak area of polypropylene resin to normalize for any variation in thickness of films. A compact, less oily film was obtained with formulation #1. The films were then wiped with a cotton cloth for about 1 minute by hand. The same area scanned before wiping was analyzed using FTIR after wiping to detect the change in the level of —OH groups and the results are shown in Table 1. The considerably higher loss (almost 10 times) for the liquid additives indicated their poor rub fastness. The final product might experience such loss during storage, handling and post-spinning operations. The hydroxyl ratio was determined using the FTIR curves as follows:

Hydroxyl Ratio (HR)=peak area of —OH (3700–3000 cm−1)/peak area of PP (2752–2693 cm−1)

TABLE 1

| Sample ID. | HR before wiping | HR after wiping | Percent Loss |
| --- | --- | --- | --- |
| Formulation #1 | 86.04 | 85.77 | 0.31 |
| Formulation #2 | 19.27 | 18.57 | 3.6 |
| Formulation #3 | 21.62 | 20.86 | 3.5 |

These results indicated that formulation #1 was the best in the non-migratory category. However, please also note that the level of Wetting agent in formulation #1 was almost 30% over that in the other two formulations considered. Therefore, even though additive loading was higher in formulation #1, it was surprising to have better nonmigratory properties also. The reason for this non-transferability is believed to be due to the fact that the surfactant solidifies or crystallizes during cooling and this result is shown in FIG. 3. This DSC curve indicates that on cooling the concentrates of formulation #1, depending on the rate of cooling during the process, there will be a competition between polypropylene and wetting agent as to which one will crystallize first. Accordingly, they will form two separate crystallite entities (Wetting agent around 50° C. and PP around 115° C.).

Melt Spinning into Filaments/Fibers

The Let-Down-Ratio (LDR%) refers to the percent by weight of the concentrates containing the additives added to the polymer to make fibers, films, etc., to yield a certain final level of the additives in the finished article. The concentrates made by extrusion compounding using different formulations were dry blended homogeneously with a polypropylene resin (MFR-35; Amoco Polypropylene Homopolymer Resin Grade 7956) for fiber spinning. The fiber spinning was performed on Hills Research Line using the concentrates, that is, Formulations #1, #2, and #3, to produce multifilaments with 4 denier per filament (dpf). A die with circular cross-section was used during spinning. The melt temperature was kept at 220° C. The filaments were quenched using ambient air. Once the melt exited the spinnerett, the filaments were drawn by three sets of rollers at variable speed to arrive at a final denier of 4 dpf. The spin finish application was not performed during spinning as this may change the surface characteristics. A control fiber with same parameters was made prior to making the fibers with additives. The different sets of filaments made by fiber spinning are shown in Table 2. All samples pertaining to formulation #1, that is, F11, F12 and F13, posed no spinning problems such as drop in pressure, screw slippage, breakage of filaments, difficulty in winding, etc. However, during the spinning of samples F23 (used formulation #2) and F33 (used formulation #3), it was observed that the outlet pressure was fluctuating indicative of screw slippage and there were many broken filament.

TABLE 2

| Sample ID. | Description |
| --- | --- |
| F11 | 2.5% LDR of formulation #1 in Polypropylene of 12 Melt Flow Rate |
| F12 | 7.5% LDR of formulation #1 in Polypropylene of 12 Melt Flow Rate |
| F13 | 12.5% LDR of formulation #1 in Polypropylene of 12 Melt Flow Rate |
| F23 | 17.0% LDR of formulation #2 in Polypropylene of 12 Melt Flow Rate |
| F33 | 17.0% LDR of formulation #3 in Polypropylene of 12 Melt Flow Rate |

Wettability

The multifilaments were then wound onto a card-wrap in a convenient form for further testing. This provided a flat surface for wettability testing. Portions of the filaments were tested for the amount of additive using FTIR. Wettability tests were determined by placing a colored water (red food dye) drop on the surface of fibers and measuring the time taken for absorption of water by the filaments. In the case of Wetting agent additives, depending on the amount of final level in the fiber, the migration was highly time-dependent. The test results on the filaments are shown in Table 3.

TABLE 3

| Sample ID. | Spreading Behavior | Wetting Behavior | Time for Complete Wetting |
| --- | --- | --- | --- |
| F11 | None | None | None |
| F12 | Instant | Partial | 5 minutes |
| F13 | Instant | Instant | 1 minute |
| F23 | None | None | None |
| F33 | Instant | Instant | 5 minutes |

These results indicated that the wetting agent with the highest monoglyceride content (the additive in formulation #1) was the best among the additives investigated in this test in terms of both spreading (wicking if the test is performed vertically) and wetting. The efficacy for fibers with low orientation and crystallinity was achieved between 3 to 5% by weight final level of wetting agent in the fibers. The deficiency in the above test procedure includes the assumption of a flat surface in filaments wrapped on a card. Since all the fibers wrapped onto the card may not lie in the same plane and thus very rarely is a flat surface presented, this test is more of a quantitative screening test to qualify surfactants for use in the present invention for modifying fiber surfaces.

The softness test is subjective and varies from person to person. The spools of filaments were felt by many people and a subjective conclusion was reached. The spools of samples F12 and F13 were found to be much smoother and softer in feel when compared to the other samples.

Melt Blown Nonwovens

The efficacy of the surfactant of the present invention was extended to melt blown nonwovens. The trials were conducted on a 6" wide die melt blown research equipment at the Textiles and Nonwovens Development Center (TANDEC) at the University of Tennessee, Knoxville, Tenn. The melt blown process required the use of a high melt flow rate, typically about 400–1200 MFR polypropylene material to produce very fine fibers. In this example, the polypropylene was Escorene® PP3546 polypropylene. The fiber diameter was usually between 2–5 microns on an average and was a function of the type of polymer, viscosity of the polymer, throughput rate, process temperature, air temperature and air velocity.

The different melt blown fabrics produced are shown in Table 4.

TABLE 4

| Sample ID. | Description |
| --- | --- |
| MB4 | 20% LDR of formulation #4 in Polypropylene of 1000 Melt Flow Rate |
| MB5 | 15% LDR of formulation #5 in Polypropylene of 1000 Melt Flow Rate |

The following process parameters were used to produce the melt blown nonwovens:

| | |
| --- | --- |
| Die temperature | 230° C. |
| Air temperature | 220° C. |
| Throughput rate | 5.8 Kg/hour |
| Basis Weight | 60 grams/sq.m. |
| Die-Collector Distance | 30 cm |
| Collector speed | 10 m/min. |
| Fiber Diameter | 2–5 microns |

Wettability

The melt blown fabrics were then tested for wettability by placing a colored water (red food dye) on top of the fabrics.

Unlike the card wrap of the melt spun fibers, the melt blown webs/fabrics had a flat surface that made the wettability testing easier. The results on different samples are shown in Table 5.

TABLE 5

| Sample ID. | Wetting | Spreading |
|---|---|---|
| MB4 | Instant (less than 1 minute) | Instant (less than 1 minute) |
| MB5 | None (hydrophobic) | None (hydrophobic) |

The higher orientation and crystallinity of the melt blown fibers helped to modify the surface of the otherwise hydrophobic polypropylene melt blown fabrics even with lower amounts of Wetting agent compared to melt spun fibers.

Spunbond Nonwovens

Spunbond nonwovens are used in top sheet applications for diapers. The polypropylene filaments after the spinning stage are bonded to each other by thermal means using two heated calender rollers under constant pressure. The fiber diameter is usually between 15 to 25 microns on an average and is a function of the type of polymer, viscosity of the polymer, process conditions such as the temperature of polymer, air pressure and temperature, orientation etc. The spunbond trials were conducted at TANDEC using a 1 meter wide research Reicofil spunbond line.

The different spunbond fabrics made using the concentrate of formulation #6 are shown in Table 6 and an Exxon PP3445 polypropylene (MFR-35; available from Exxon) (please note that MFR is determined according to ASTM method D1238 and is in units of g/10 minutes).

TABLE 6

| Sample ID. | Description |
|---|---|
| SB #1 | Control Poypropylene |
| SB #2 | 2% LDR of Formulation #6 |
| SB #3 | 6% LDR of Formulation #6 |
| SB #4 | 10% LDR of Formulation #6 |
| SB #5 | 15% LDR of Formulation #6 |

The following process parameters were used to produce the spunbond nonwovens:

Die temperature: 230 deg. C.
Throughput rate: 73 Kg/hr
Fabric width: 1 meter
Average Fiber diameter: 23 microns
Collector speed: 55 m/min.
Calender temperature: 137 deg. C.
Calender Pressure: 18 Kg/ Sq.cm
Bonding Area: 14%

Wettability

The spunbond fabrics were tested for wettability by placing a colored water on top of the fabrics and the results are shown in Table 7:

TABLE 7

| Sample ID. | Wetting | Spreading |
|---|---|---|
| SB #1 | None | None |
| SB #2 | Slight | None |

TABLE 7-continued

| Sample ID. | Wetting | Spreading |
|---|---|---|
| SB #3 | Good | Slight |
| SB #4 | Instant | Instant |
| SB #5 | Instant | Instant |

What is claimed is:

1. Wettable fibers or filaments prepared from a composition comprising a polymer having incorporated therein a wetting agent, wherein said polymer is selected from the group consisting of olefin polymers, polyesters and polyamides and wherein said wetting agent consists essentially of a glyceride selected from the group consisting of a mono glyceride, a combination of mono-glycerides and a mixed glyceride having a mono glyceride content of at least 85 percent by weight.

2. The fibers or filaments of claim 1, wherein the glyceride is a mono glyceride having the empirical formula

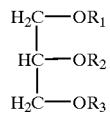

wherein $-OR_1$, $-OR_2$, and $-OR_3$ represent, independently, hydroxyl or a fatty acid ester group, but where only one of them is a fatty ester group having from about 12 to about 22 carbon atoms.

3. The fiber or filaments of claim 2, wherein $-OR_2$ is a hydroxyl group.

4. The fiber or filaments of claim 2, wherein the monoglyceride is glyceryl monostearate.

5. The fiber or filaments of claim 4, wherein the glyceryl monostearate is α-glyceryl monostearate.

6. The fibers or filaments of claim 1, wherein the glyceride is a mixed glyceride, wherein the mixed glyceride is a combination of at least one mono-glyceride and at least one other glyceride selected from the group consisting of di-glycerides and tri-glycerides, wherein each glyceride in the combination has the empirical formula

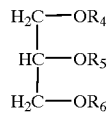

wherein $-OR_4$, $-OR_5$, and $-OR_6$ represent, independently, a hydroxyl group or a fatty acid ester group and a mono-glyceride has only one fatty ester group, a di-glyceride has two fatty ester groups and the tri-glyceride has three fatty ester groups.

7. The fiber or filaments of claim 6, wherein each fatty ester group is the same or different and has from about 12 to about 22 carbon atoms.

8. The fibers or filaments of claim 1, wherein the polymer is an olefin polymer.

9. The fibers or filaments of claim 8, wherein the olefin polymer is polypropylene.

10. The fibers or filaments of claim 8, wherein the olefin polymer is LLDPE.

11. The fibers or filaments of claim 8, wherein the olefin polymer is LDPE.

12. The fibers or filaments of claim 8, wherein the olefin polymer is HDPE.

13. The fibers or filaments of claim 8, wherein the olefin polymer is a copolymer.

14. The fibers or filaments of claim 1, wherein the polymer is a polyamide.

15. The fibers or filaments of claim 14, wherein the polyamide is selected from the group consisting of nylon 6 and nylon 6,6.

16. The fibers or filaments of claim 1, wherein the polymer is a polyester.

17. The fibers or filaments of claim 16, wherein the polyester is selected from the group consisting of polyethylene terephthalate and polybutylene terephthalate.

18. The fibers or filaments of claim 1, wherein the wetting agent is present in an amount of about 0.1 to about 20 percent by weight.

19. The fibers or filaments of claim 18, wherein the wetting agent is present in an amount of about 1 to about 10 percent by weight.

20. The fibers or filaments of claim 1, wherein the fibers or filaments are in the form of a woven fabric.

21. The fibers or filaments of claim 1, wherein the fibers or filaments are in the form of a non-woven fabric.

22. The fibers or filaments of claim 1, wherein the fibers or filaments are in the form of a knitted fabric.

23. The fibers or filaments of claim 1, when combined with other fibers, thereby imparting thermoplasticity, softness and wettability properties to the whole.

24. The fibers or filaments of claim 1, when employed as a wettable portion of products selected from the group consisting of diaper products, battery cell separators, filters, papers, membranes, diaphrawetting agent and construction materials.

25. The fibers or filaments of claim 1 in the form of a dispersion in an aqueous medium.

26. The fibers or filaments of claim 1 of a fine denier size.

27. The fibers or filaments of claim 26 having a denier from about 0.5 to about 10.

* * * * *